Patented Oct. 13, 1931

1,827,538

UNITED STATES PATENT OFFICE

ALEXANDER M. NASTUKOFF, OF MOSCOW, UNION OF SOCIALIST SOVIET REPUBLICS

PLASTIC COMPOSITION

No Drawing. Original application filed March 21, 1927, Serial No. 177,217. Divided and this application filed November 1, 1928. Serial No. 316,629.

My invention relates to plastic compositions and has a particular reference to compositions prepared from petroleum hydrocarbons with formalin.

This is a divisional application of my application Serial No. 177,217 filed Mar. 21, 1927.

I have previously discovered and described a process whereby a solid precipitate is obtained from petroleum oils by treating them with formalin. I have used this process substantially for the determination of relative qualities of lubricating oils derived from petroleum. I have given a name of "Formolite" to the solid residue obtained by this reaction.

The formolite, however, as made by this process, was somewhat soft and even viscous, so that its filtration was difficult and often impossible. It contained a more or less large amount of absorbed hydrocarbons, which could not be removed by ordinary processes of filtration and could not be even washed out with liquid solvents such as gasoline. These absorbed hydrocarbons prevented the cohesion between individual particles of formolite so that it could not be compressed or shaped into a solid substance. Such solid substance could not be formed even if binding materials were used as the formolite would not form a union with such substances.

In my new process of treating petroleum oils, as described in the above application, I introduce steam during the process and subject the resultant solid precipitate to the drying process. As a result I obtain, after washing out absorbed saturated hydrocarbons, a new product to which I have given a name of "New Formolite" to distinguish it from my old formolite. This new product does not contain any absorbed hydrocarbons and it possesses a new and important property that it can be compressed into a solid mass.

In order to obtain the new formolite in such plastic form, crude petroleum oil or petroleum oil derivatives which contain both saturated and unsaturated hydrocarbons (for example), is treated with sulphuric acid and formalin and subjected to the action of steam. The solid precipitate is filtered out and dried at an increased temperature. It is then freed from the absorbed hydrocarbons by means of a sutiable solvent, such as gasoline or benzine. The new formolite thus obtained is in the form of a brown or yellow powder which possesses a certain amount of plasticity and can be compressed into a hard and solid substance, changing its color during compression into a deep black. It also proves to be a suitable material to be added to carbolite or reaction products of phenol in the process of their preparation, improving their ultimate properties and cheapening the production.

The new formalite can be also mixed with such materials as mineral oil, mineral oil pitch etc., forming compositions which can be cast in molds for making insulating articles for electrical apparatus, also for other industrial purposes.

In the preparation of the new formolite as much as four volumes of sulphuric acid to one volume of petroleum oil can be used. I have found, however, that when the mixture is treated with steam, as described above, the amount of sulphuric acid need not be so great and may be reduced to an amount equal to one half of the volume of crude oil. Up to two volumes of formalin can be used to one volume of crude oil, but with the steam treatment the amount of formalin may be reduced to $\frac{1}{4}$ volume of the crude oil.

The steam treatment represents an important phase in this process as it enables the reaction to be carried to the end, thereby obtaining a plastic new formolite. The drying process (preferably at an increased temperature) is also important, as it renders the new formolite susceptible to the subsequent treatment with light hydrocarbon solvents.

The following example illustrates the practical application of my process.

4 volumes of crude oil are mixed with 2 volumes of concentrated sulphuric acid and one volume of formalin is gradually added while vigorously shaking the mixture. The mixture is then heated for one hour at a temperature of 100 degrees centigrade, is diluted with about one volume of water and subjected to the action of steam for another hour or more until all the light hydrocarbons are evaporated. The solid precipitate is removed by filtering (or by some other suitable process, for instance, by centrifugal apparatus), washed and neutralized. This precipitate which represents the product of reaction of formalin on unsaturated hydrocarbons in presence of acid, contains also absorbed in its substance saturated hydrocarbons. In order to remove these hydrocarbons the precipitate, after being dried at a temperature of 100–105 degrees centigrade, is treated with light hydrocarbon solvents, such as gasoline, naphtha or benzine.

The resultant purified product I call "New Formolite".

This substance, when compressed into a solid mass, possesses remarkable dielectric properties: a plate 4.93 millimeters thick requires 51,300 volts for a break down, and a plate 8.75 mm. thick—66,300 volts, exceeding in this respect the high grade electrical porcelain.

The compressed substance is also strong mechanically and can be conveniently machined and polished.

I claim as my invention:

A process of producing a solid dielectric body which consists in adding to four volumes of petroleum oil containing both unsaturated and saturated hydrocarbons, first at least two volumes of concentrated sulfuric acid, and then at least one volume of formalin, heating the mixture to the boiling point of water, adding water to the heated mixture, and then evaporating light hydrocarbons by introducing steam, thereby enabling the reaction to go to completion, then separating from the liquid the resultant precipitate, washing, neutralizing and drying the precipitate and finally dissolving from the precipitate, the absorbed saturated hydrocarbons.

In testimony whereof I affix my signature.

ALEXANDER M. NASTUKOFF.